(12) United States Patent  
Reed

(10) Patent No.: US 7,882,296 B2
(45) Date of Patent: Feb. 1, 2011

(54) DEADLOCK AVOIDANCE IN A BUS FABRIC

(75) Inventor: David G. Reed, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 294 days.

(21) Appl. No.: 12/330,515

(22) Filed: Dec. 9, 2008

(65) Prior Publication Data

US 2009/0089477 A1 Apr. 2, 2009

Related U.S. Application Data

(62) Division of application No. 11/673,971, filed on Feb. 12, 2007, now Pat. No. 7,478,189, which is a division of application No. 10/817,553, filed on Apr. 1, 2004, now Pat. No. 7,315,912.

(51) Int. Cl.
*G06F 13/36* (2006.01)
*G06F 13/00* (2006.01)

(52) U.S. Cl. .................. 710/310; 710/311; 710/23; 710/5; 710/33; 710/52; 711/141; 711/154; 711/169

(58) Field of Classification Search ............... 710/5–6, 710/22–35, 52–57, 309–315; 711/112–113, 711/142–143, 149–159, 169
See application file for complete search history.

(56) References Cited

U.S. PATENT DOCUMENTS

| | | | |
|---|---|---|---|
| 6,243,781 B1 | 6/2001 | Gandhi et al. | |
| 6,487,615 B1 | 11/2002 | Hunsaker | |
| 6,721,813 B2 | 4/2004 | Owen et al. | |
| 6,832,279 B1 | 12/2004 | Potter et al. | |
| 6,862,673 B2 | 3/2005 | Lee et al. | |
| 6,915,371 B1 | 7/2005 | Berndt et al. | |
| 7,003,615 B2 | 2/2006 | Chui et al. | |
| 7,107,415 B2 | 9/2006 | Jeddeloh et al. | |
| 7,143,242 B2 | 11/2006 | Hill et al. | |
| 2003/0074493 A1* | 4/2003 | Askar et al. | 710/8 |
| 2003/0093637 A1 | 5/2003 | Lee et al. | |
| 2003/0097514 A1 | 5/2003 | Ennis et al. | |
| 2003/0115513 A1* | 6/2003 | Harriman et al. | 714/49 |
| 2003/0131174 A1 | 7/2003 | Heynemann et al. | |
| 2004/0024947 A1 | 2/2004 | Barth et al. | |
| 2005/0182869 A1* | 8/2005 | Lee et al. | 710/55 |

FOREIGN PATENT DOCUMENTS

EP 0 342 107 A2 11/1989

* cited by examiner

*Primary Examiner*—Christopher B. Shin
(74) *Attorney, Agent, or Firm*—Townsend and Townsend and Crew LLP

(57) ABSTRACT

Circuits, apparatus, and methods for avoiding deadlock conditions in a bus fabric. One exemplary embodiment provides an address decoder for determining whether a received posted request is a peer-to-peer request. If it is, the posted request is sent as a non-posted request. A limit on the number of pending non-posted requests is maintained and not exceed, such that deadlock is avoided. Another exemplary embodiment provides an arbiter that tracks a number of pending posted requests. When the number pending posted requests reaches a predetermined or programmable level, a Block Peer-to-Peer signal is sent to the arbiter's clients, again avoiding deadlock.

20 Claims, 8 Drawing Sheets

DEADLOCK AVOIDANCE IN A BUS FABRIC

CROSS-REFERENCES TO RELATED APPLICATIONS

This application is a divisional of U.S. patent application Ser. No. 11/673,971, filed Feb. 12, 2007, entitled "Deadlock Avoidance in a Bus Fabric," which is a divisional of U.S. patent application Ser. No. 10/817,553, filed Apr. 1, 2004, (now U.S. Pat. No. 7,315,912), having the same title, both of which are hereby incorporated by reference.

BACKGROUND

The present invention relates generally to deadlock avoidance in a bus fabric, and more particularly to deadlock avoidance at an interface between integrated circuits.

Few applications stress the resources of a computer systems to the extent that video does. Video capture, encoding, and the like involve huge transfers of data between various circuits in a computer system, for example, between video-capture cards, central processing units, graphics processors, systems memories, and other circuits.

Typically, this data is moved over various buses, such as PCI buses, HyperTransport™ buses, and the like, both on and between the integrated circuits that form the computer system. Often, first-in-first-out memories (FIFOs) are used to isolate these circuits from one another, and to reduce the timing constraints of data transfers between them.

But these FIFOs consume expensive integrated circuit die area and power. Accordingly, it is desirable to limit the depth of the FIFOs. Unfortunately, this means that these FIFOs may become filled and not able to accept further inputs, thus limiting system performance.

It is particularly problematic if these filled FIFOs are in a data path that forms a loop. In that case, there may be a processor, such as a graphics processor, or other circuit in the loop that becomes deadlocked, that is, unable to either receive or transmit data.

This can happen under the following conditions, for example. A first FIFO that receives data from a circuit cannot receive data because it is full. The first FIFO cannot send data to a second FIFO because the second FIFO is also full. The second FIFO similarly cannot send data because it wants to send the data to the circuit, which cannot accept it since it is waiting to send data to the first FIFO. This unfortunate set of circumstances can result in a stable, deadlocked condition.

Thus, what is needed are circuits, methods, and apparatus for avoiding these deadlocked conditions. While it may alleviate some deadlocked conditions to increase the size of the FIFOs, again there is an associated cost in terms of die area and power, and the possibility remains that an even deeper FIFO may fill. Thus, it is desirable that these circuits, methods, and apparatus not rely solely on making these FIFOs deeper and be of limited complexity.

SUMMARY

Accordingly, embodiments of the present invention provide circuits, apparatus, and methods for avoiding deadlock conditions. One exemplary embodiment provides an address decoder for determining whether a received posted write request is a peer-to-peer request. If it is, the request is converted to a non-posted write request. A limit on the number of pending non-posted requests is maintained and not exceeded, such that deadlock is avoided. The number of pending non-posted requests is tracked by subtracting the number of responses received from the number of non-posted requests sent.

Another exemplary embodiment does not convert received posted requests to non-posted requests, but rather provides an arbiter that that tracks the number of pending posted requests. When the number of pending posted requests (for example, the number of pending requests in a FIFO or queue) reaches a predetermined or programmable level, that is a low-water mark, a Block Peer-to-Peer signal is sent to an arbiter's clients. This keeps the FIFOs in a data loop from filling, thus avoiding deadlock. When a response or signal indicating that the number of pending posted requests is below this level is received by the arbiter, the Block Peer-to-Peer signal is removed, and peer-to-peer requests may again be granted. Alternately, the number of pending peer-to-peer requests may be tracked, and when a predetermined or programmable level is reached, a Block Peer-to-Peer signal is asserted. Circuits, methods, and apparatus consistent with the present invention may incorporate one or both of these or the other embodiments described herein.

A further exemplary embodiment of the present invention provides a method of transferring data. This method includes receiving a transfer request, determining if the transfer request is a write to a memory location, if the transfer request is a write to a memory location, then sending the transfer request as a posted request, otherwise determining a number of available transfer request entries in a posted-request first-in-first-out memory, and if the number of transfer request entries available is greater than a first number, then sending the transfer request as a posted request, otherwise waiting to send the transfer request as a posted request.

A further exemplary embodiment of the present invention provides another method of transferring data. This method includes maintaining a first number of tokens, receiving a plurality of posted requests, if a remaining number of the first number of tokens is less than a first number, forwarding one of the plurality of posted requests as a non-posted request, else not forwarding the one of the plurality of posted requests as a non-posted request.

Yet another exemplary embodiment of the present invention provides an integrated circuit. This integrated circuit includes an arbiter configured to track a number of available entries in a posted request FIFO, a plurality of clients coupled to the arbiter, and a HyperTransport bus coupled to the arbiter, wherein the arbiter receives peer-to-peer requests from the plurality of clients and provides posted requests to the posted request FIFO, and when the number of available entries in the posted request FIFO is equal to a first number, then preventing the plurality of clients from sending peer-to-peer requests.

A better understanding of the nature and advantages of the present invention may be gained with reference to the following detailed description and the accompanying drawings.

DESCRIPTION OF EXEMPLARY EMBODIMENTS

Figure 1:
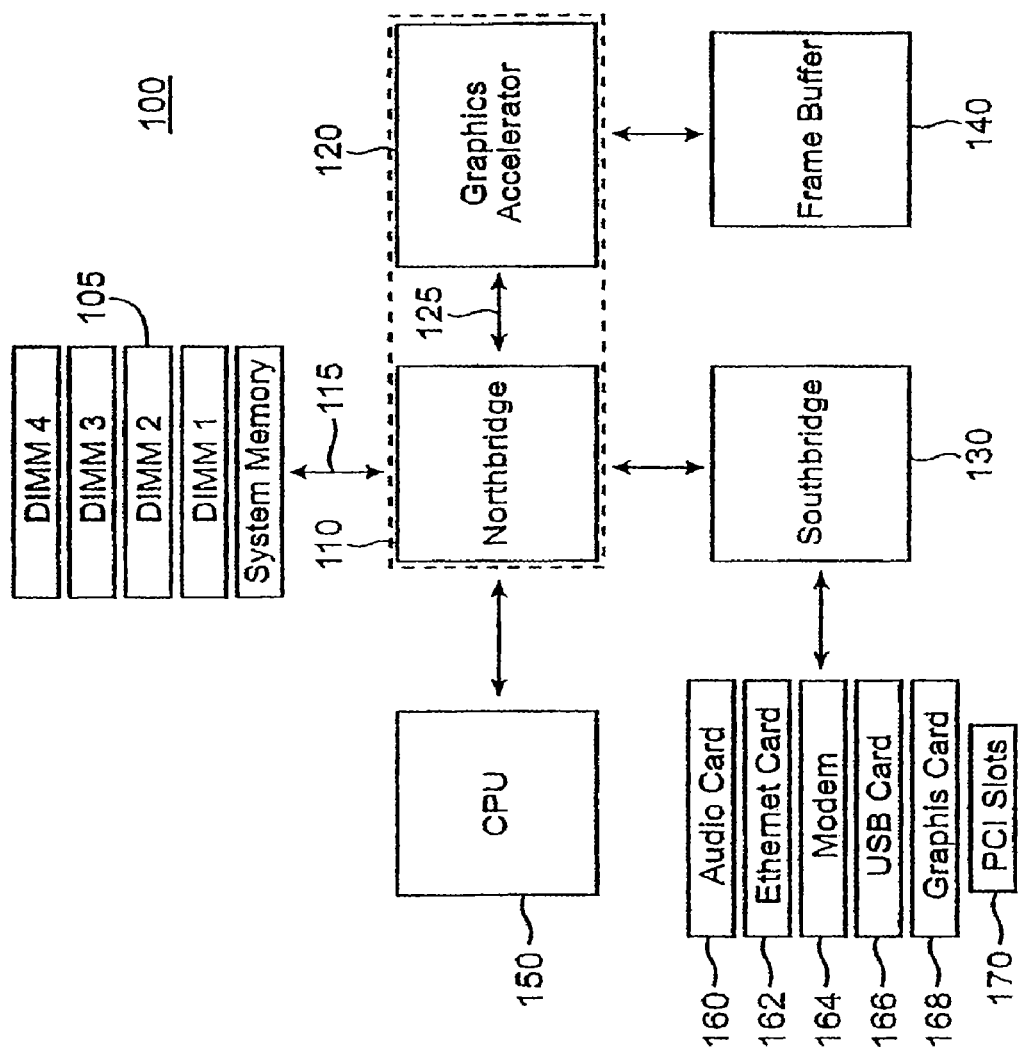
FIG. 1 is a block diagram of a computing system that benefits by incorporation of embodiments of the present invention.

FIG. 1 is a block diagram of a computing system 100 that benefits by incorporation of embodiments of the present invention. This computing system 100 includes a Northbridge 110, graphics accelerator 120, Southbridge 130, frame buffer 140, central processing unit (CPU) 150, audio card 160, Ethernet card 162, modem 164, USB card 166, graphics card 168, PCI slots 170, and memories 105. This figure, as with all the included figures, is shown for illustrative purposes only, and does not limit either the possible embodiments of the present invention or the claims.

The Northbridge 110 passes information from the CPU 150 to and from the memories 105, graphics accelerator 120, and Southbridge 130. Southbridge 130 interfaces to external communication systems through connections such as the universal serial bus (USB) card 166 and Ethernet card 162. The graphics accelerator 120 receives graphics information over the accelerated graphics port (AGP) bus 125 through the Northbridge 110 from CPU 150 and directly from memory or frame buffer 140. The graphics accelerator 120 interfaces with the frame buffer 140. Frame buffer 140 may include a display buffer that stores pixels to be displayed.

In this architecture, CPU 150 performs the bulk of the processing tasks required by this computing system. In particular, the graphics accelerator 120 relies on the CPU 150 to set up calculations and compute geometry values. Also, the audio or sound card 160 relies on the CPU 150 to process audio data, positional computations, and various effects, such as chorus, reverb, obstruction, occlusion, and the like, all simultaneously. Moreover, the CPU 150 remains responsible for other instructions related to applications that may be running, as well as for the control of the various peripheral devices connected to the Southbridge 130.

Figure 2:
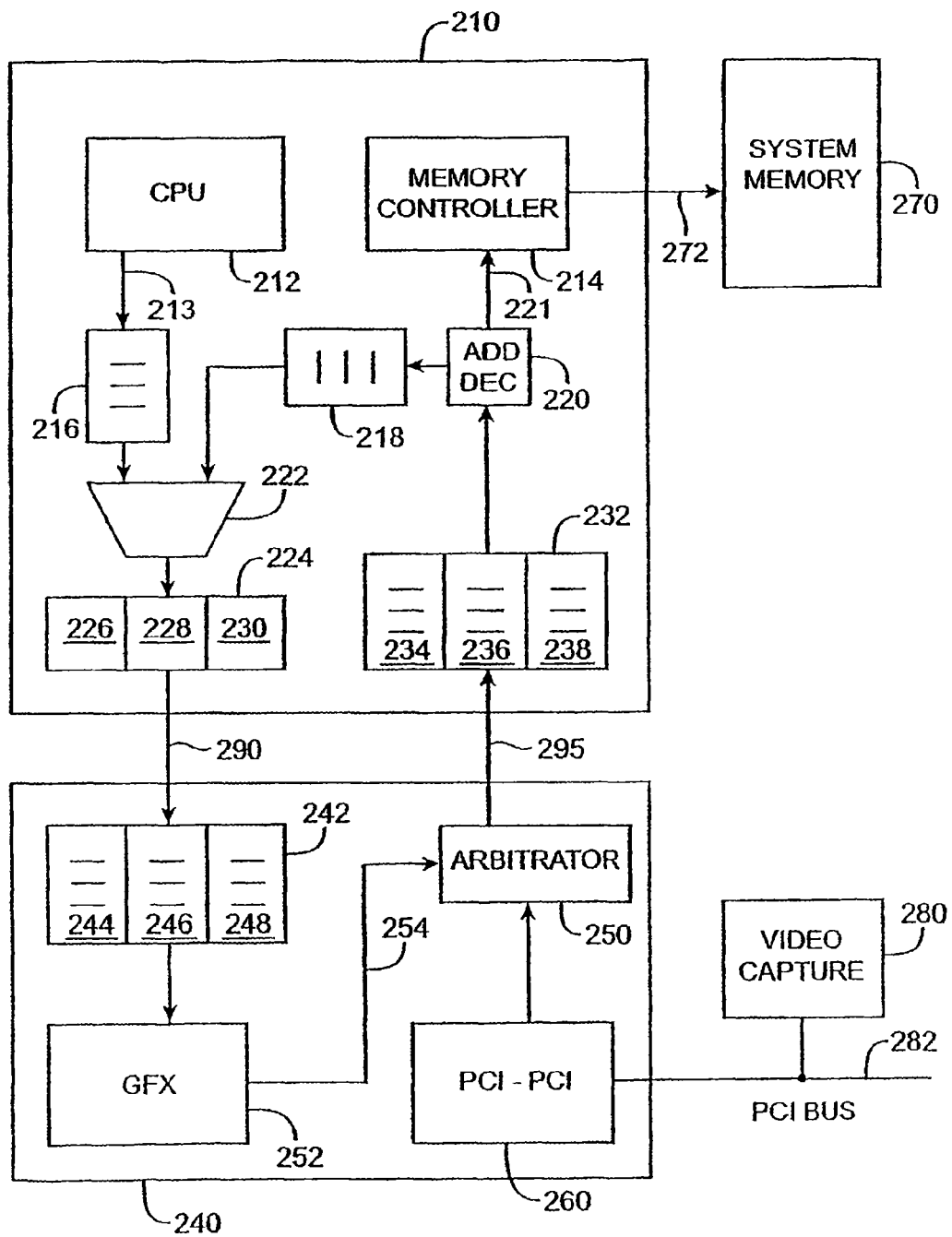
FIG. 2 is a block diagram of an improved computing system that is benefited by the incorporation of embodiments of the present invention.

FIG. 2 is a block diagram of an improved computing system that is benefited by the incorporation of embodiments of the present invention. This block diagram includes a combined processor and Northbridge 210, media control processor 240, and system memory 270. Also included in this block diagram for exemplary purposes is a video capture card 280.

The combined processor and Northbridge 210 includes a central processing unit 212, FIFO 216, multiplexer 222, output buffers 224 including one for posted requests 226, non-posted requests 228, and responses 230, input FIFO 232 including an input FIFO for posted requests 234, non-posted requests 236, and responses 238, address decoder 220, peer-to-peer FIFO 218, and memory controller 214.

The media control processor includes input FIFO 242 for posted requests 244, non-posted requests 246, and responses 248, an integrated graphics processor 252, arbiter 250, and PCI-to-PCI bridge 260. The combined CPU and Northbridge 210 communicates with the media control processor 240 over HyperTransport buses 290 and 295. The system memory 270 couples to the memory controller 214 over memory interface bus 272, while the video capture card 280 is connected to the PCI-to-PCI bridge 260 over the PCI bus 282.

In a specific embodiment of the present invention, the combined CPU and Northbridge 210 is formed on a first integrated circuit, while the media control processor 240 is formed on a second integrated circuit. In another embodiment, the graphics processor 252 is not integrated on the media control processor, but is rather a separate integrated circuit communicating over an advanced graphics processor (AGP) bus with the media control processor 240. In other embodiments, these various functions may be divided in other ways and integrated on different numbers of integrated circuits communicating over various buses.

Data and requests move between these integrated circuits and integrated circuit blocks over buses. In the case of a write request, a circuit requests that it be allowed to place data on a bus, and that request is granted. The data may either be sent as a posted request, in which no response is required, or as a non-posted request, in which case a response is required. The response is sent back to the sending circuit after the write has been completed at its destination circuit.

These different transactions, posted requests, non-posted requests, and responses, are stored in separate FIFOs as shown. These separate FIFOs may be the same size, or they may be different sizes. Further, the various FIFOs may have different sizes. In one specific embodiment, the non-posted request FIFO 236 has 6 entries, the peer-to-peer FIFO 218 has two entries, and the non-posted request FIFO 228 has 16 entries. In various embodiments, the peer-to-peer FIFO 218 may be one FIFO for storing posted and non-posted requests and responses, or it may be separate FIFOs for storing the different types of transactions. More information about these various types of requests and peer-to-peer transactions can be found in the HyperTransport specification, which is currently on release 1.05 published by the HyperTransport Consortium, which is incorporated by reference.

In this new architecture, the graphics processor has become separated from the system memory. This separation leads to data paths that can form a loop, and thus become deadlocked. Specifically, data transfers from the CPU 212 and video capture card 280 may fill the various FIFOs.

In the configuration shown in FIG. 2, the CPU 212 writes to a frame buffer in the system memory 270 utilizing the following path. The CPU 212 provides requests (data), on line 213 to the FIFO 216. The FIFO 216 provides data to the multiplexer 222, which in turn provides the data to the output buffers 224. The buffers 224 provide data over HyperTransport bus 290 to FIFO 242, which in turn provide data to the graphics buses 252. The graphics processor 252 provides the requests on line 254 to the arbiter 250. The arbiter 250 provides the requests back over the HyperTransport bus 295 to the FIFO 232. The FIFO 232 provides the request to the address decoder 220, which in turn provides them to the memory controller 214. The memory controller 214 writes to the system memory 270 over memory interface buses 272.

Also in this configuration, the video capture card 218 writes data to a frame buffer in the systems memory 270 utilizing the following path. The video capture card 280 provides data on PCI bus 282 to the PCI-to-PCI bridge 260. The PCI-to-PCI bridge 260 provides data to the arbiter 250, which in turn provides the requests over HyperTransport bus 295 to the FIFO 232. The FIFO 232 provides the requests to the address decoder 220, which in turn provides it to the peer-to-peer FIFO 218. The peer-to-peer FIFO 218 provides the data to multiplexer 222, which in turn provides it to the output buffers 224. The output buffers 224 provide the data to the FIFO 242, which in turn provides it to the graphics processor 252.

The graphics processor 252 then writes to the frame buffer in the systems memory 270 utilizing the following path. The graphics processor 252 provides modified requests on line 254 to the arbiter 250. The arbiter 250 provides the data over HyperTransport bus 295 to the FIFO 232. FIFO 232 provides the data to the address decoder 220. This time, the address decoder sees a new address provided by the graphics processor 252, and in turn provides the request to the memory controller 214. The memory controller 214 then writes the data to the systems memory 270 over memory interface buses 272.

As can be seen, this convoluted path crosses the HyperTransport interface buses 290 and 295 a total of three times. Particularly in situations where the CPU 212 and video capture card 280 are writing to a frame buffer in the systems memory 270, the FIFOs 242, 232, and 218 may become full, that is, unable to accept further inputs. In this case, the situation may arise where the graphics processor 252 tries to write data to the frame buffer in the systems memory 270, but cannot because the arbiter 250 can not grant the graphics processor 252 access to the HyperTransport bus 295. Similarly, the receive FIFO 232 cannot output data because the peer-to-peer FIFO 218 is full. Further, the peer-to-peer FIFO 218 cannot output data because the media control processor input FIFO 242 is similarly full. In this situation, the bus fabric is deadlocked and an undesirable steady-state is reached.

Figure 3:
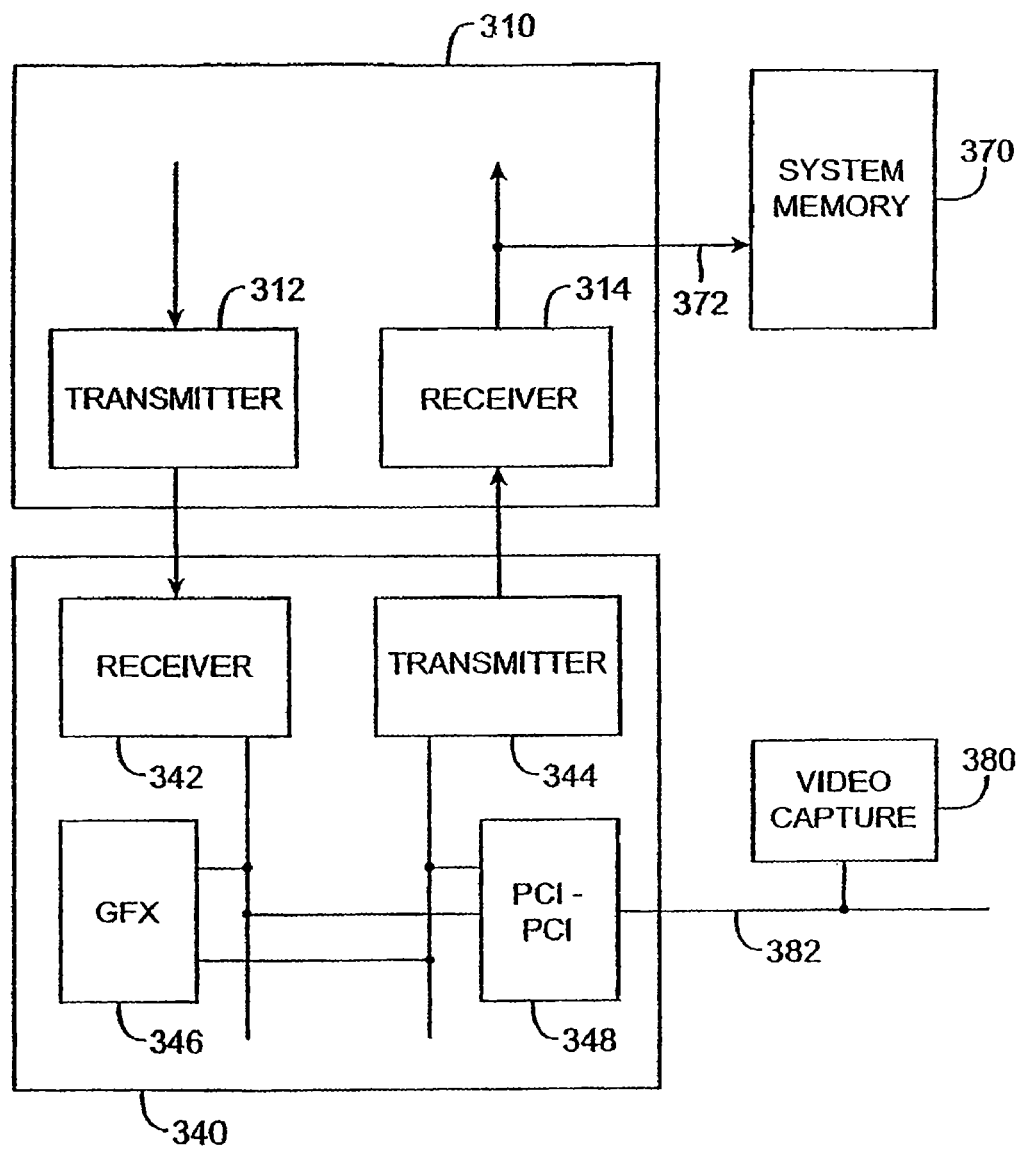
FIG. 3 is a simplified block diagram of the improved computing processing system of FIG. 2.

FIG. 3 is a simplified block diagram of the improved computing processing system of FIG. 2. Included are a combined CPU and Northbridge 310, media control processor 340, system memory 370, and video capture card 380. The combined CPU and Northbridge 310 includes a transmitter 312 and receiver 314, while the media control processor includes a receiver 342, transmitter 344, graphics processor 346, and PCI-to-PCI bridge 348. A systems memory 370 communicates with the combined CPU and Northbridge over a memory interface bus 372. In this particular example, a video capture card 380 is included, which communicates with the media control processor over a PCI bus 382.

Figure 4:
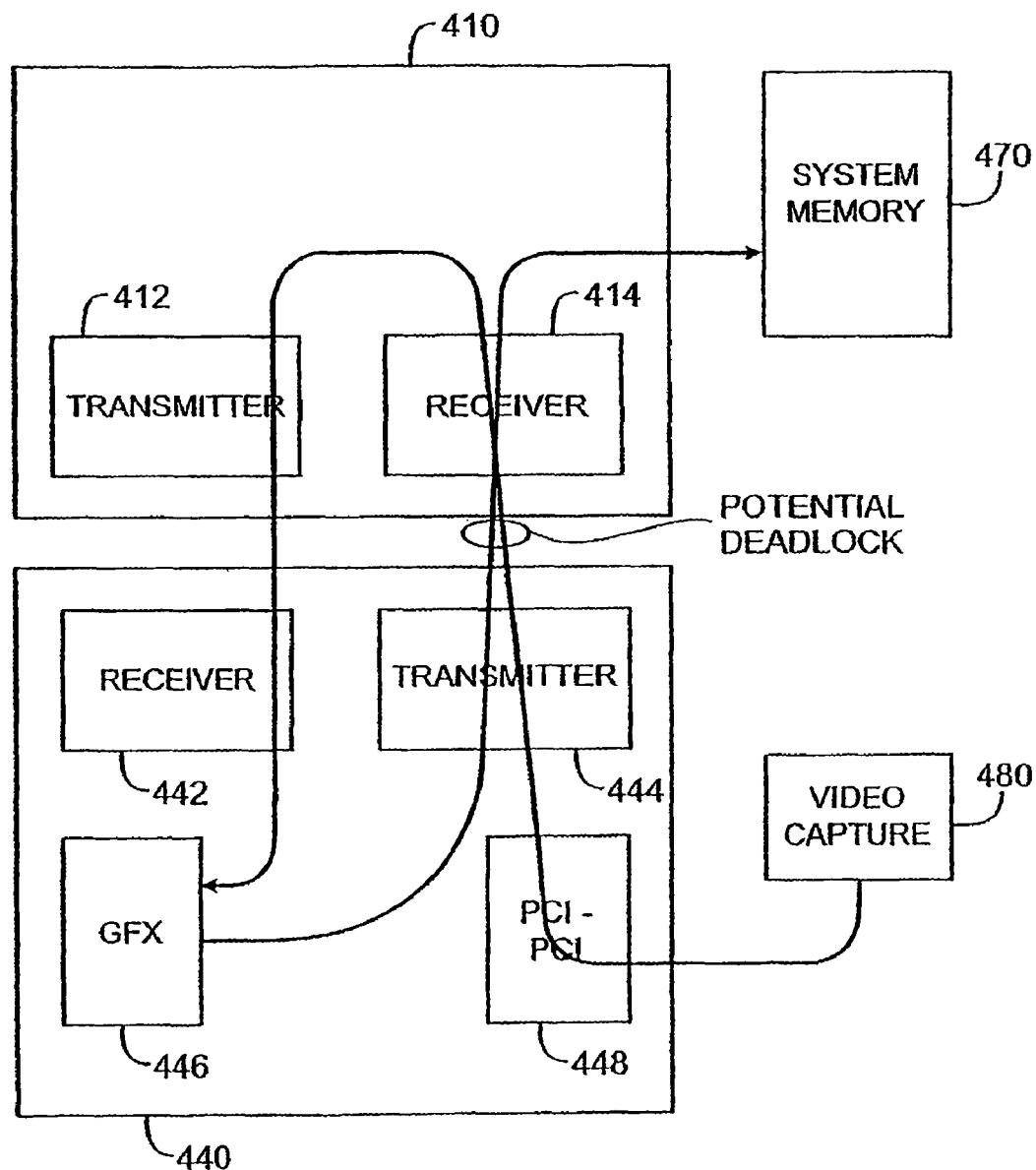
FIG. 4 is a further simplified block diagram of the improved computing system of FIG. 2 illustrating the write path from a video-capture card to a system memory.

FIG. 4 is a further simplified block diagram of the improved computing system of FIG. 2 illustrating the write path from the video-capture card 480 to the system memory 470. This block diagram includes a combined CPU and Northbridge 410, media control processor 440, system memory 470, and video capture card 480. The combined CPU and Northbridge circuit includes a transmitter 412 and receiver 414. The media control processor includes a receiver 442, transmitter 444, graphics processor 446, and PCI-to-PCI bridge 448.

The video capture card 480 provides requests to the PCI-to-PCI bridge 448, which in turn provides them to the transmitter 444. The transmitter 444 sends requests to the receiver 414, which in turn provides them to the transmitter 412. The transmitter 412 sends these requests to the receiver 442, which passes them along to the graphics processor 446. The graphics processor 446 writes the data to the systems memory by sending it as a request to the transmitter 444, which in turn provides it to the receiver 414. The receiver 414 then writes the data to the systems memory 470.

As can be seen, the requests cross from the transmitter 444 to the receiver 414 twice during this process. This is where the potential for a deadlock arises. Specifically, in the deadlocked condition, the graphics processor cannot send a request to the transmitter 444, because the transmitter cannot send to the receiver 414, since its associated FIFO is full. The graphics processor cannot accept a new request because it is waiting to granted its own request. Accordingly, it cannot drain the FIFO in the receiver 442. Again, a deadlocked condition arises, creating an undesirable steady-state.

Figure 5:
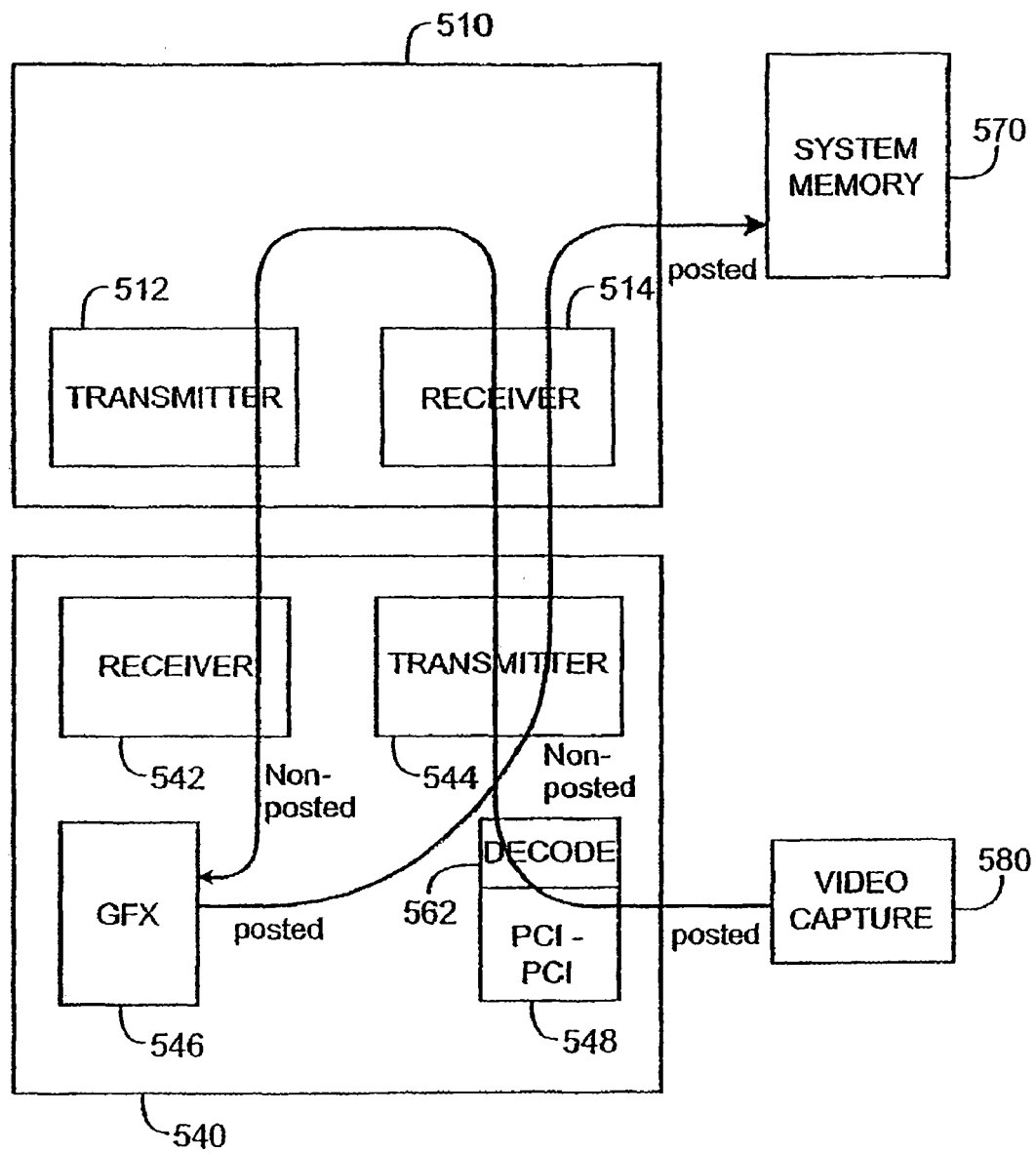
FIG. 5 is a simplified block diagram of the improved computing system of FIG. 2 that incorporates an embodiment of the present invention.

FIG. 5 is a simplified block diagram of the improved computing system of FIG. 2 that incorporates an embodiment of the present invention. This block diagram includes a combined CPU and Northbridge 510, media control processor 540, systems memory 570, and video card 580. The combined CPU and Northbridge 510 includes a transmitter 512 and a receiver 514. The media control processor 540 includes a receiver 542, transmitter 544, graphics processor 546, and PCI-to-PCI bridge 548. The PCI-to-PCI bridge 548 further includes an address decoder 562.

A posted request is provided by the video capture card 580 to the PCI-to-PCI bridge 548. The address decoder 562 in the PCI-to-PCI bridge 548 determines that this posted request is a peer-to-peer request and converts it to a non-posted request and passes it to the transmitter 544. The transmitter 544 sends this request as a non-posted request that is sent to the receiver 514. The receiver 514 then sends the request to the transmitter 512, which passes it to the receiver 542. The receiver 542 in turn provides the request to the graphics processor 546.

The graphics processor 546 then reflects the request back upstream to the transmitter 544 as a posted request having an address in the frame buffer in the system memory 570. The graphics processor also issues a "target done" completion response. The combined CPU and Northbridge 510 receive the posted request and response from the transmitter 544. The posted request is sent to the system memory 570, and the response is sent back to the media control processor 540, where it is received by the PCI-to-PCI bridge 548.

In this embodiment, the number of pending non-posted requests is limited to some number "N", such as 1, and when this number is reached, no further non-posted requests are provided to the transmitter 544. Specifically, as a non-posted request is sent, a count is incremented in the address decoder portion 562 of the PCI-to-PCI bridge 548. As responses are received by the PCI-to-PCI bridge 548, this count is decremented. When the count is reached, further non-posted requests are held by the address decoder 562. This avoids the deadlocked condition described above.

Figure 6:
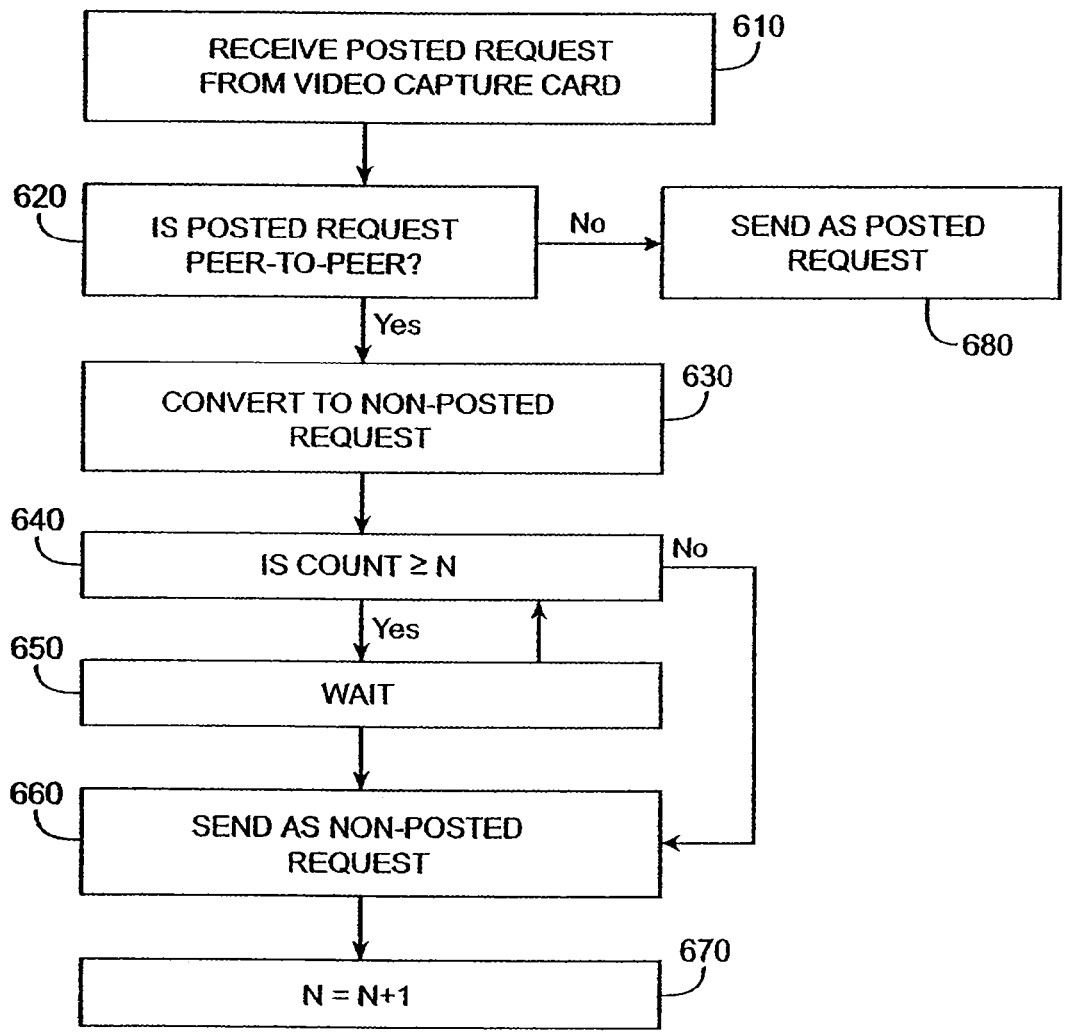
FIG. 6 is a flowchart further describing a specific embodiment of the present invention.

FIG. 6 is a flowchart further describing this specific embodiment of the present invention. In act 610, a posted request is received from a video capture card. In act 620, the address associated with the request is decoded and a determination of whether the request is peer-to-peer or to be written to the system memory is made. If it is not a peer-to-peer request, that is, it is data to be written to the system memory, it is sent as a posted request in act 680. If it is a peer-to-peer request, the request is converted to a non-posted request in act 630. In act 640, it is determined whether the number of pending non-posted requests is equal to a predetermined or programmable number of allowable pending non-posted requests, such as 1 or another number, in act 650. If the count has not reached this number "N", the request may be sent as a non-posted request in act 660, and the count is incremented by one in act 670. If the count has reached "N" however, the requests is stalled or not granted in order to avoid a deadlocked condition in act 650. As non-posted requests are completed, responses are received and the count is decremented.

Returning to FIG. 2, we can see how this embodiment is implemented in greater detail. The video capture card 280 provides posted requests on PCI bus 282 to the PCI-to-PCI bridge 260. An address decoder in the PCI-to-PCI bridge 260 determines whether the request is a write to the system memory 270. If it is, that request is passed to the arbiter 250 which places it in the posted request FIFO 234, which forwards it to the memory controller 214, which writes it to the system memory 270.

If the posted request is a peer-to-peer request, that is, it is not to be written directly to the system memory 270 but is destined for a peer circuit, for example the graphics processor 252, then the posted request is converted to a non-posted request by an address decoder (or other circuit) in the PCI-to-PCI bridge 260. This non-posted request is routed from the arbiter 250 to the non-posted request FIFO 236, to the peer-to-peer FIFO 218. The non-posted request then reaches the graphics processor 252 via bus 290. The graphics processor converts the request back to a posted request and also issues a response. The posted request is passed to the memory controller 214 which writes the data to the system memory 270, while the response is received by the PCI-to-PCI bridge 260.

The decoder in the PCI-to-PCI bridge 260 also keeps track of the number of pending non-posted requests, and does not send non-posted requests to the non-posted request FIFO 236 once it has determined that a predetermined or programmable number of pending non-posted requests has been reached.

Figure 7:
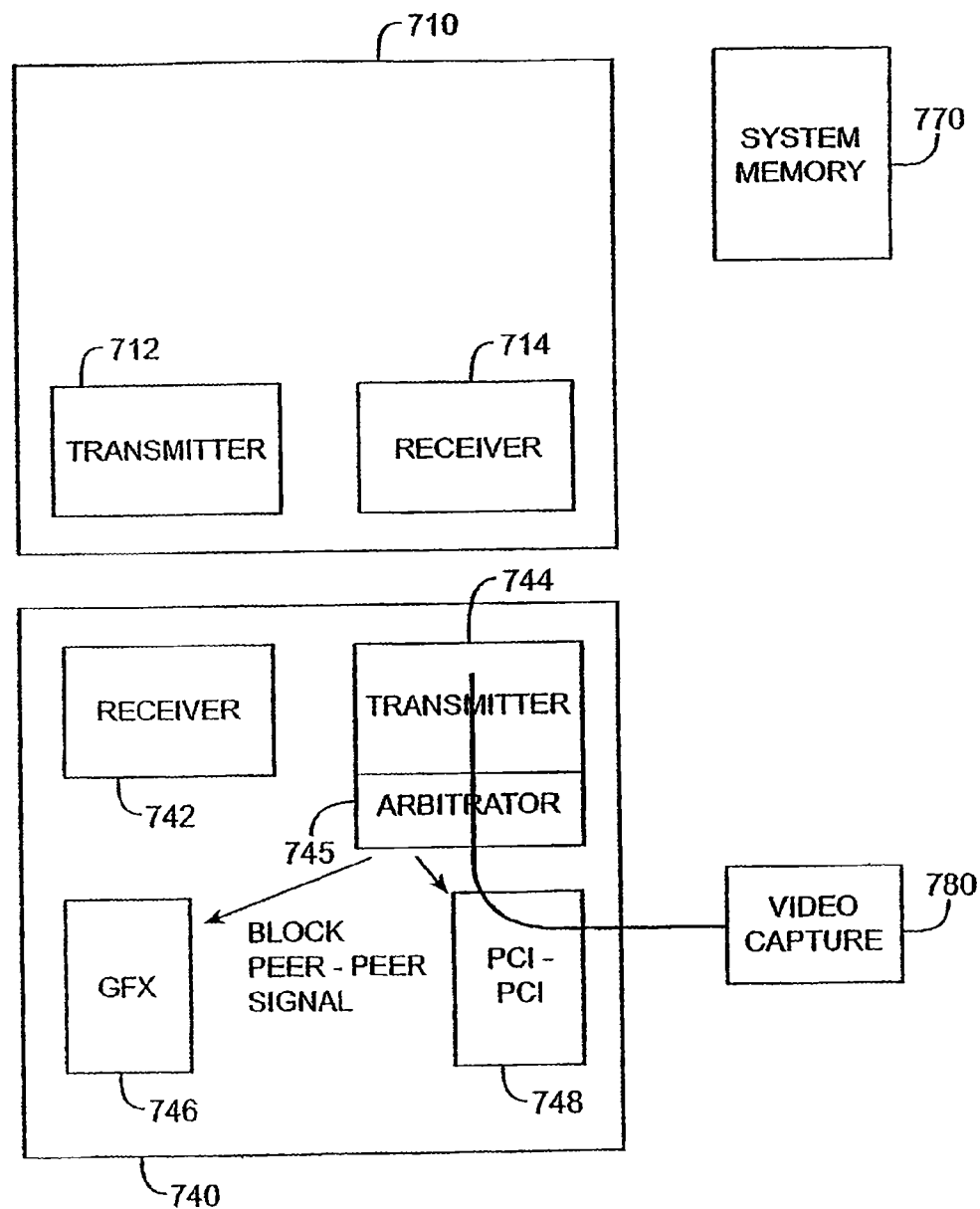
FIG. 7 is a simplified block diagram of the improved computing system of FIG. 2 that incorporates an embodiment of the present invention.

FIG. 7 is a simplified block diagram of the improved computing system of FIG. 2 that incorporates an embodiment of the present invention. This block diagram includes a combined CPU and Northbridge 710, media control processor 740, systems memory 770, and video-capture card 780. The combined CPU and Northbridge 710 includes a transmitter 712 and receiver 714. The media control processor 740 includes a receiver 742, transmitter 744, graphics processor 746, and PCI-to-PCI bus 748. The transmitter 744 further includes an arbiter 745.

Posted requests provided by the video capture card 780 are provided to the PCI-to-PCI bridge 748, which passes them to the arbiter 745. The arbiter tracks posted requests (or alternately, peer-to-peer requests) that are pending at the receiver 714. When a certain number of posted requests remain pending, the arbiter 745 sends out a Block Peer-to-Peer signal to its clients such as the graphics processor 746 and PCI-to-PCI bridge 748. In this case, no further peer-to-peer requests are sent to the arbiter 745 until a response indicating that there is room in the receiver 714 posted request FIFO is received by the arbiter 745.

If the Block Peer-to-Peer signal is not asserted, the posted request is provided to the transmitter 744, which sends it to the receiver 714. The receiver 714 routes it to the receiver 742 via the transmitter 712. The receiver 742 passes the posted request to the graphics processor 746. The graphics processor 746 in turn passes it to the transmitter 744 to the receiver 714, which provides it to the system memory 770.

Figure 8:
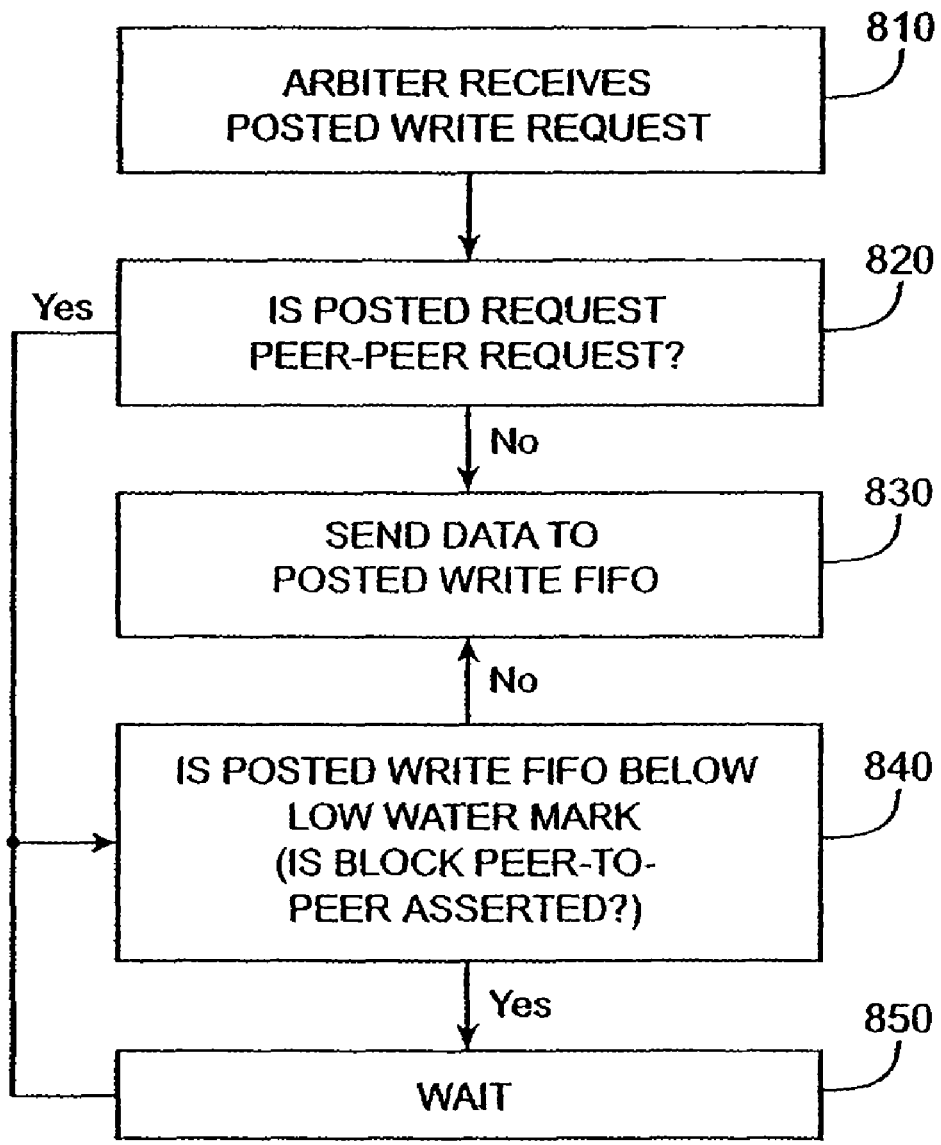
FIG. 8 is a flowchart further describing a specific embodiment of the present invention.

FIG. 8 is a flowchart further describing this specific embodiment of the present invention. In act 810, an arbiter receives a posted request, for example from a video capture card. In act 820, the arbiter determines whether the posted request is a peer-to-peer request. If it is not, then in act 830, the data is sent as a posted write request. If it is, then in act 840, it is determined whether the FIFO is below its low-water mark, or alternatively, whether a block peer-to-peer signal or state has been asserted. If this is true, then in act 850, the arbiter waits for an entry to become available in the posted write FIFO. At some point, the posted write FIFO provides an output, thus freeing up an entry. At this time, the arbiter releases the Block Peer-to-Peer signal and the data is sent to the posted write FIFO in act 830.

Returning to FIG. 2, we can see how this embodiment is implemented in greater detail. The video capture card 280 provides posted requests on PCI bus 282 to the PCI-to-PCI bridge 260. The PCI-to-PCI bridge 260 passes these requests to the arbiter 250. The arbiter keeps track of a number of pending posted requests in the posted request FIFO 236 (or alternately, the number of pending peer-to-peer requests, or the number of posted requests in FIFO 218). When the number of pending posted requests in the posted request FIFO 236 reaches a predetermined or programmable level the arbiter 250 broadcasts a Block Peer-to-Peer signal to the graphics processor 252, PCI-to-PCI bridge 260, and other client circuits. This keeps those circuits from sending further peer-to-peer requests, thus avoiding a deadlocked condition.

When the number of pending posted requests is below this low-water mark, the posted request is sent to the posted request FIFO 234. The posted request is then routed through the peer-to-peer FIFO 218, multiplexer 222, FIFOs 226 and 244, to the graphics processor 252. The graphics processor then converts the address to a system memory address 270, and forwards the posted request to the arbiter 250. The arbiter 250 passes the posted request to the posted request FIFO 234, to the memory controller 214, which writes data to the system memory 270.

In one embodiment, at power up, the arbiter 250 receives a number of tokens, for example six tokens. As the arbiter provides a peer-to-peer posted request to the posted request FIFO 234, it sends along one of these tokens. As the posted request FIFO outputs a peer-to-peer posted request, the arbiter receives a token. If the count of tokens drops to a low-water mark level, for example one, the arbiter 250 asserts the Block Peer-to-Peer signal. When tokens are received, the Block Peer-to-Peer signal is removed.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of transferring data comprising:
    receiving a transfer request, where the transfer request is a posted request;
    determining if the transfer request is a write to a memory location;
    determining if the transfer request is a peer-to-peer request;
    if the transfer request is a write to a memory location, then sending the transfer request as a posted request; else if the transfer request is a peer-to-peer request,
    converting the transfer request to a non-posted request;
    determining a number of pending non-posted requests; and
    if the number of pending non-posted requests is less than a first number; then
    sending the transfer request as a non-posted request; else
    waiting to send the transfer request as a non-posted request.

2. The method of claim 1 wherein the transfer request is made by a video capture card.

3. The method of claim 1 wherein the transfer request is made by a graphics processor.

4. The method of claim 1 wherein the transfer request is sent over a HyperTransport bus.

5. The method of claim 1 wherein the number of pending non-posted requests is determined by an address decoder.

6. The method of claim 1 wherein the first number is programmable.

7. The method of claim 1 wherein the first number has a value of one.

8. A method of transferring data comprising:
receiving a posted request;
if the posted request not a peer-to-peer request, then sending the posted request; else
converting the posted request to a non-posted request;
determining a number of pending non-posted requests; and
if the number of pending non-posted requests is less than a first number; then
sending the posted request as a non-posted request; else
waiting to send the posted request as a non-posted request.

9. The method of claim 8 wherein the posted request is made by a video capture card.

10. The method of claim 8 wherein the posted request is made by a graphics processor.

11. The method of claim 8 wherein the posted request is sent over a HyperTransport bus.

12. The method of claim 8 wherein the number of pending non-posted requests is determined by an address decoder.

13. The method of claim 8 wherein the first number is programmable.

14. The method of claim 8 wherein the first number has a value of one.

15. A method of transferring data comprising:
receiving a first posted request with a first circuit;
if the first posted request is a write to a memory, then sending the first posted request to the memory, otherwise converting the first posted request to a non-posted request;
determining a number of pending non-posted requests; and
if the number of pending non-posted requests is less than a first number; then
sending the first posted request as a non-posted request to a second circuit; else
waiting to send the first posted request as a non-posted request; and
once the number of pending non-posted requests is less than the first number; then
sending the first posted request as a non-posted request to a second circuit;
receiving the non-posted request with the second circuit;
converting the non-posted request to a second posted request; and
sending the second posted request to the memory and sending a completion response to the first circuit.

16. The method of claim 15 wherein receiving a first posted request with a first circuit comprises receiving a first posted request with a PCI-PCI bridge.

17. The method of claim 16 wherein the PCI-to-PCI bridge further comprises an address decoder, where the address decoder determines whether the posted request is a write to the memory.

18. The method of claim 17 wherein the memory is external to the integrated circuit.

19. The method of claim 18 wherein receiving the non-posted request with the second circuit comprises receiving the non-posted request with a graphics processor.

20. The method of claim 19 wherein the first posted request is provided by a video capture card.

* * * * *